US008682808B2

(12) United States Patent
Ding et al.

(10) Patent No.: US 8,682,808 B2
(45) Date of Patent: Mar. 25, 2014

(54) METHOD AND APPARATUS FOR PROCESSING LOGISTIC INFORMATION

(75) Inventors: Hong Wei Ding, Beijing (CN); Jin Dong, Beijing (CN); Minmin Qiu, Beijing (CN); Wei Wang, Beijing (CN); Yan Qing Xie, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 13/015,690

(22) Filed: Jan. 28, 2011

(65) Prior Publication Data

US 2011/0191258 A1 Aug. 4, 2011

(30) Foreign Application Priority Data

Jan. 29, 2010 (CN) .......................... 2010 1 0104976

(51) Int. Cl.
*G06Q 99/00* (2006.01)
(52) U.S. Cl.
USPC ........... 705/337; 705/331; 705/332; 705/333; 705/330; 705/341
(58) Field of Classification Search
USPC .................. 705/337, 341, 330, 331, 332, 333
See application file for complete search history.

(56) References Cited

U.S. PATENT DOCUMENTS 5,265,006 A * 11/1993 Asthana et al. .............. 705/7.26
6,721,762 B1 * 4/2004 Levine et al. ................. 1/1
7,085,687 B2 8/2006 Eckenwiler
7,366,643 B2 4/2008 Verdura
2009/0171500 A1 7/2009 Matsumoto
2010/0089011 A1 * 4/2010 Armington et al. ............. 53/472
2010/0153277 A1 * 6/2010 Yu .................................. 705/80

FOREIGN PATENT DOCUMENTS

EP 1909221 4/2008

OTHER PUBLICATIONS

Chen Chuanyu, et al. "Workload Forecasting in a Container Terminal" downloaded from http://www.simplus.sg/papers/MTEC07.pdf.
Yosuke Kimura & Kenichi Ida, "Palletizing Problem Using Genetic Algorithm"Proceedings of the Fifth Asia Pacific Industrial Engineering and Management Systems Conference 2004.
Toyohiro Umeda, et al. "Optimiation Search Algorithm of Allocation Planning for Strip Coils in Hold for Shipment by Using Operational Know-how". ISIJ Intern'l, vol. 41, 01,#5.
H.C.W. Lau, et al. "An AI Approach for Optimizing Multi-Pallet Loading Operations". Expert Systems with Applications 36 (2009) 4296-4312.

* cited by examiner

*Primary Examiner* — Akiba Allen

(57) ABSTRACT

Information of articles to be loaded is received, indicating and numbers of the articles to be loaded. A historic loading plan record is read. An item of the historic loading plan record includes at least a loading plan and an adaptive index corresponding to the loading plan. A loading plan suitable for the current transportation is generated based on the historic loading plan record and the information of articles to be loaded. The technical solution of this invention may reduce the requirements on storage and computing resources.

25 Claims, 1 Drawing Sheet

METHOD AND APPARATUS FOR PROCESSING LOGISTIC INFORMATION

CROSS-REFERENCE TO RELATED APPLICATION(S)

This application claims foreign priority to P.R. China Patent application 201010104976.5 filed 29 Jan. 2010, the complete disclosure of which is expressly incorporated herein by reference in its entirety for all purposes.

FIELD OF THE INVENTION

The present invention relates to the field of information processing, and more particularly, relates to a method and an apparatus for processing logistic information.

BACKGROUND OF THE INVENTION

In a logistic system, it is often required to deliver different kinds of articles from one location to another, for example delivering goods from a warehouse to a sales site. In the case that a delivery task needs to be completed at multiple times, computer technology may be utilized to generate a loading plan to indicate which articles as well as how many articles are to be delivered during each transportation, so as to implement the delivery task within minimal times, thereby leveraging the transportation capability more effectively. For example, a transportation tool and articles may be modeled such that the transportation tool and various kinds of articles are modeled to have a solid shape with a certain geometric size, and then simulation technology may be used to acquire a loading plan by which solid shapes representing articles may be contained in the solid shape representing the transportation tool as many as possible is calculated with a simulation technology.

However, generating a shipping plan with the modeling method requires consumption of large amount of storage and computing resources. It should be easily understood that it is required at least to store data describing the model, and considerable operations are necessary for performing a three-dimensional simulation. Due to the irregularity of the solid shapes of articles, if the established model is too simple, space of the transportation tool must be wasted; however, on the other hand, if the established model is too complex, the data required to describe the model and the complexity for three-dimensional simulation operations will be increased. Besides, the modeling method cannot involve other factors in actual condition that affect loading other than solid shapes of the transportation tool and articles, for example, the articles' compressibility, bendability, and fragility, etc.

SUMMARY OF THE INVENTION

In view of the above, the present invention provides a method and apparatus for processing logistic information.

The method comprises receiving information of articles to be loaded, indicating items and numbers of the articles to be loaded; reading a historic loading plan record, an item of the historic loading plan record at least comprising a loading plan and an adaptive index corresponding to the loading plan; generating a loading plan suitable for the current transportation based on the historic loading plan record and the information of articles to be loaded.

The apparatus comprises: a module for receiving information of articles to be loaded, configured to receive information of articles to be loaded indicating items and numbers of the articles to be loaded; a module for reading historic loading plan record, configured to read a historic loading plan record, one item of the historic loading plan record comprising at least a loading plan and an adaptive index corresponding to the loading plan; and a module for generating loading plan, configured to generate a loading plan suitable for the current transportation based on the historic loading plan record and the information of articles to be loaded.

With the technical solutions according to embodiments of the present invention, it is no longer needed to store data describing the established model, nor is it necessary to perform a three-dimensional simulation with considerable operations. It is easily understood that according to the technical solution of the embodiments of the present invention, the more the historic loading plans and the corresponding adaptive indexes are recorded, the higher is the obtained theoretic adaptive index for the loading plan for the current transportation. In addition, with the solution according to embodiments of the present invention, loading rules other than the solid shapes will be taken into account, without recording these rules in a complex and fussy way.

BRIEF DESCRIPTION OF THE DRAWINGS

Inventive features regarded as the characteristics of the present invention are set forth in the appended claims. However, the present invention per se, its preferred modes, objectives, features and advantages will be better understood through reading the following detailed description on the exemplary embodiments with reference to the accompanying drawings, where in the drawings:

DETAILED DESCRIPTION OF PREFERRED EMBODIMENTS

Hereinafter, embodiments of the present invention will be described with reference to the accompanying drawings. In the following description, many specific details are illustrated so as to understand the present invention more comprehensively. However, the skilled in the art would appreciate that the present invention may be carried out without some of these specific details, and the present invention is not limited to the particular embodiments as described herein. On the contrary, arbitrary combination of the following features and elements may be considered to implement the present invention, regardless of whether they relate to different embodiments. Thus, the following aspects, features, embodiments and advantages are only for illustrative purposes, and should not be understood as elements or limitations of the appended claims, unless otherwise explicitly specified in the claims. It should be further noted that in order to prevent the present invention to be obscured due to unnecessary details, only apparatus structures and/or processing steps closely related to the solution according to the present invention are shown in the accompanying drawings, while other details having little relations are omitted. Additionally, unless deliberately limited with "direct" or "indirect," the term "connection" in the present application documents includes otherwise both direct connection and indirect connection.

Figure 1:
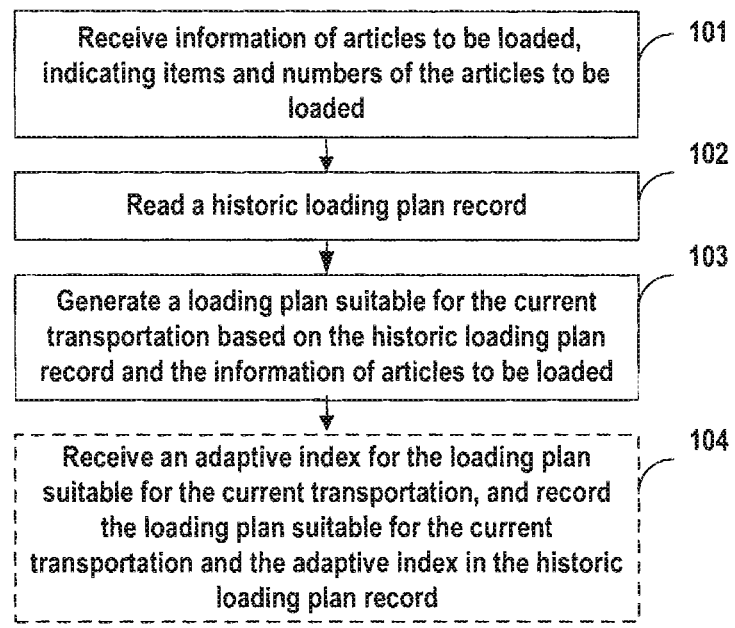
FIG. 1 shows a flow chart of a logistic information processing method according to an embodiment of the present invention.

As shown in FIG. 1, the logistic information processing method according to the embodiments of this invention comprises:

Step 101, receiving information of articles to be loaded, which information indicates items and numbers of the articles to be loaded;

Step 102, reading a historic loading plan record.

Table 1 and Table 2 show exemplarily historic loading plan records.

TABLE 1

Exemplary Historic Loading Plan Record

| Serial Number | Historic Loading Plan | | | | Adaptive Index |
|---|---|---|---|---|---|
| 1 | A (6) | B (1) | C (5) | D (0) | 0.60 |
| 2 | A (5) | B (0) | C (7) | D (0) | 0.80 |
| 3 | A (0) | B (10) | C (1) | D (0) | 0.85 |
| 4 | A (6) | B (3) | C (1) | D (1) | 0.55 |

As shown in FIG. 1, according to an embodiment of the present invention, an item of the historic loading plan is a loading plan that actually happened in the past and an adaptive index corresponding to the loading plan.

A loading plan at least specifies the items and numbers of loaded articles. For example, in the loading plan 1, there are 6 pieces of article A, 1 piece of article B, 5 pieces of article C, and 0 piece of article D that were loaded.

TABLE 2

Exemplary Historic Loading Plan Record

| Serial Number | Historic Loading Plan | | | | Transportation Tool | Adaptive Index |
|---|---|---|---|---|---|---|
| 1 | A (6) | B (1) | C (5) | D (0) | 5T | 0.60 |
| 2 | A (5) | B (0) | C (7) | D (0) | 20T | 0.80 |
| 3 | A (0) | B (10) | C (1) | D (0) | 10T | 0.85 |
| 4 | A (6) | B (3) | C (1) | D (1) | 5T | 0.55 |

As shown in Table 2, in a historic loading plan record according to another embodiment of the present invention, an item of the historic loading plan further records the transportation tool corresponding to the loading plan. For example, loading capacity may be utilized to indicate the type of a transportation tool. The skilled in the art may also indicate the type of the transportation tool in other manner. Similarly, the skilled in the art may understand that the transportation tool may be further differentiated with, inter alia, the solid shape and loading capacity limit of the transportation tool as required.

The adaptive index as shown in Table 1 and Table 2 is a scoring on the loading plan. Since the historic loading plan records store loading plans that actually happened in the past, each loading plan may be scored by the loader executing this loading plan.

An actual loading depends to some extent on the loader's experience. Besides attempting to finish the delivering task with fewer times at all possible, the loader is further required to consider factors affecting the loading such as compressibility, bendability, and fragility of articles. It would be very complex and fussy to enumerate these factors as loading rules that can be understood by a computer system. However, through scoring on an actual loading plan by a loader, various kinds of loading rules may be embodied in a more flexible manner. For example, if a loading rule is to avoid arranging articles M and N together to the utmost, then the loader may give a low score to the loading plan in which the article M and article N are loaded at one time, while giving a higher score to a loading plan only having one of articles M and N loaded.

Step 103, generating a loading plan suitable for the current transportation based on the historic loading plan and the information of articles to be loaded.

After generating the loading plan suitable for the current transportation, the loading plan suitable for the current transportation is provided to the loader.

Optionally, at step 104, an adaptive index corresponding to the load plan suitable for the current transportation as provided after being loaded in executing the current load plan may be received. The system records the loading plan suitable for the current transportation and the adaptive index in the historic loading plan record.

Further, optionally, a modification recommendation provided for the loading plan suitable for the current transportation may be received, and the modified loading plan may be recorded in the historic loading plan record. In this case, an entry of the historic loading plan record may not record an adaptive index directed to the modified loading plan, because it may be deemed that the modified loading plan corresponds in default to the maximum value of the adaptive index or has a value higher than a certain threshold. If each loading plan as generated in step 103 is required to receive the modification recommendation, then the field "adaptive index" may not be provided in the entry of the historic loading plan record. However, as previously mentioned, even without this field, it can be still deemed that the entry of the historic loading plan record indicates that the loading plan has a maximum value of the adaptive index or has a value higher than a certain threshold. Thus, this case is embraced in "an entry of the historic loading plan record at least comprising a loading plan and an adaptive index corresponding to this loading plan."

Hereinafter, the description will focus on how to generate a loading plan suitable for the current transportation based on a historic loading plan record.

Embodiment 1

According to this embodiment, relevance between every two articles to be loaded is calculated based on a historic loading plan record. According to an embodiment of the present invention, the relevance between two articles may be obtained by calculating the ratio between the following two quantities: the number of loading plans simultaneously including these two articles in the historic loading plan record, and the number of loading plans merely comprising one of the two articles in the historic loading plan record. At least one of the above numbers may be a number that is weighted by the adaptive index, and the outcome is the relevance between two articles weighted according to the adaptive index. For example, when calculating the number of historic loading plans, it is possible to merely calculate the number of historic loading plans whose adaptive indexes are higher than a threshold. For another example, a relevance between article i and article j may be calculated according to the following equation.

$$P(i,j) = \frac{\sum_{r1 \in R \text{ and } r1 \text{ includes articles } i \text{ and } j} R_{r1}}{\sum_{r2 \in R \text{ and } r2 \text{ includes one and only one of articles } i \text{ and } j} R_{r2}}$$

where r1 and r2 both indicate loading plans actually happened in the past, $R_{r1}$ and $R_{r2}$ are adaptive indexes corresponding to r1 and r2, and R is a historic loading plan record. In other words, the higher the adaptive index of a loading plan that actually happened is, the greater is its contribution to the number of loading plans, which is more advantageous to obtain relevance with a high adaptive index. As can be understood by a person skilled in the art, only calculating the number of historic loading plans whose adaptive indexes are higher than a threshold when calculating the number of historic loading plans is a kind of method for weighting according to adaptive indexes, i.e., the weight is 1 for an adaptive index higher than the threshold, while the weight is 0 for an adaptive index lower than the threshold. Those skilled in the art may also envisage other methods of defining and calculating relevance between every two articles in the articles to be loaded based on a historic loading plan record. For example, it is possible to calculate the number of loading plans including at least one of two articles in the historic loading plan record, rather than the number of loading plans merely including one of two articles in the historic loading plan record. Or, in the above equation, r2 is made to represent at least one of the article i and article j, rather than merely including one of article i and article j.

After the relevance between every two articles among the articles to be loaded is calculated, the articles to be loaded may be divided into a plurality of loading sets with the relevance. For example, any article to be loaded may be selected as a first article of a first loading set, and then the articles whose relevance with the article in the first loading set are greater than a relevance threshold are all selected into the first loading set, till all articles to be loaded are allocated to a certain loading set. When generating a loading plan suitable for the current transportation, the articles to be loaded belonging to the same loading set are arranged in priority.

As previously mentioned, in addition to trying to complete the delivery task with fewer times if at all possible, the factors affecting loading such as the compressibility, bendability, and fragility of the articles should be taken into account in the actual loading. These factors may affect whether two or more articles should be transported together. However, the method of expressing these factors into fixed rules is quite complex and fussy. By learning relevance between articles through a historic lading plan record, especially when the relevance is weighted by an adaptive index, the factors to be taken in to consideration may be expressed completely to the most extent.

The loading plan should not only indicate the items of the articles to be loaded in the current transportation, but also indicate the number of each article. A simple method is to directly utilize an actual number of the articles to be loaded in a same loading set as the number of each item in the loading plan suitable for the current transportation, and then adjustment is performed by the loader. Hereinafter, the description will focus on how to calculate a loading plan suitable for the current transportation based on a historic loading plan record.

When two or more articles belong to a same loading set, it means that there are a considerable number of historic loading plans simultaneously including these two or more articles. If the calculation of the number of loading plans uses an adaptive index for weighting, then the two or more articles belonging to a same loading set means that a considerable number of historic loading plans simultaneously including these two or more articles have a high adaptive index.

Historic loading plans simultaneously including articles belonging to a same loading set are selected, or historic loading plans simultaneously including articles belonging to a same loading set and having adaptive indexes higher than an adaptive index threshold are selected. If the loading plan further specifies the transportation tool corresponding to this loading plan, then only those historic loading plans matching the transportation tool for the current transportation are selected. Then, a loading plan suitable for the current transportation is obtained through the selected historic loading plans.

A calculation method is to utilize a method of solving a mathematical planning problem. Suppose the articles to be loaded belonging to a same loading set comprise 10 pieces of article A, 6 pieces of article B, and 1 piece of article C, then the corresponding mathematical planning problem is:

maximizing the value of rate($x,y,z$) in the case of
$0 \le x \le 10, 0 \le y \le 6, 0 \le z \le 1$, wherein x, y and z indicate the numbers of article A, article B, and article C, respectively. The rate(x, y, z) is a function with x, y, and z being independent variables, where when x, y, and z are the numbers of article A, article B, and article C in a selected historic loading plan, rate(x, y, z) are adaptive indexes corresponding to the historic loading set. Solving this mathematic planning problem is actually to obtain the maximum value of rate (x, y, z) through combinations of finite kinds of x, y, and z and the rate (x, y, z) corresponding to these combinations of finite kinds, among all of the possible cases for x, y, and z where $0 \le x \le 10$, $0 \le y \le 6$, and $0 \le z \le 1$. After the above mathematic planning problem is constructed according to an embodiment of the present invention, common methods may be used to solve the mathematical planning problem.

Another method is to utilize an artificial neural network method. For a selected historic loading plan, the number of each article is taken as an input of an artificial neural network, and a corresponding adaptive index is taken as an output of the artificial neural network. The artificial neural network is trained by using each selected historical loading plan, such that it reflects the relationship between the input and output. Then, various kinds of combinations of each number of articles to be loaded belonging to a same loading set are taken as inputs of the artificial neural network, and the outputs obtained are the theoretical adaptive indexes corresponding to the combinations of each number. According to an embodiment, the combination of numbers with the highest theoretical adaptive indexes is taken as the loading plan suitable for the current transportation. According to another embodiment of the present invention, a plurality of combinations of numbers whose theoretical adaptive indexes are higher than a threshold are available for selection by the loader. For example, it is still assumed that the articles to be loaded belonging to a same loading set comprise 10 pieces of article A, 6 pieces of article B, and 1 piece of article C, and it is further assumed that there are 1000 pieces of historic loading plans being selected, i.e., all of these 1000 pieces of historic loading plans comprise articles A, B, and C, or all of these 1000 pieces of historic loading plans comprise articles A, B, and C and their adaptive indexes are all higher than an adaptive index threshold. Firstly, these 1000 pieces of historic loading plans are used for training the artificial neural network piece by piece. After sufficient training, the artificial neural network may reflect the relationship between the number of each article as inputted and the adaptive index as outputted. Then, various kinds of combinations of the numbers of articles A, B, and C are inputted to the artificial neural network, respectively, and each combination may obtain a corresponding output value. A combination corresponding to a highest output value is selected as the loading plan suitable for the current transportation. Those skilled in the art may utilize more theories and experiences about the artificial neural network to establish, train, and use the artificial neural network, which will not be detailed here.

The third method is a statistical method. Unlike the previous two methods which obtain the numbers of article A, article B, and article C uniformly, this method obtains the numbers of the articles in the loading plan suitable for the current transportation for the articles A, B, and C, respectively, by making statistics on the numbers of respective articles in the selected historic loading plan. It is still assumed that the articles to be loaded belonging to a same loading set comprise 10 pieces of article A, 6 pieces of article B, and 1 piece of article C, and it is further assumed that there are 1000 pieces of historic loading plans being selected, i.e., all of these 1000 pieces of historic loading plans comprise articles A, B, and C, or all of these 1000 pieces of historic loading plans comprise articles A, B, and C and their adaptive indexes are all higher than an adaptive index threshold. According to an embodiment of this invention, for article A, any value between the maximum value and minimum value of the number of article A in the 1000 selected pieces of historic loading plans is utilized as the number of article A in the loading plan suitable for the current transportation. According to another embodiment of the present invention, a mean value of the numbers of article A in the 1000 selected pieces of historic loading plans is calculated as the number of article A in the loading plan suitable for the current transportation. During calculating the mean value, an adaptive index may be used to weight. The processing to article B and article C is similar. Those skilled in the art may utilize a more complex statistical method to calculate the number of various articles in the loading plan suitable for the current transportation belonging to a same loading set.

The skilled in the art may understand that the number of articles as calculated through the above three methods may be less than the actual number of the articles to be loaded. At this point, the number of articles as calculated is taken as the number of the article in the loading plan suitable for the current transportation. As to the remaining articles to be loaded, the above process may be repeated to generate a loading plan for subsequent transportation.

Particularly, for a statistical method, the number of articles as calculated may be more than the actual number of the articles to be loaded. Those skilled in the art may understand that at this point, the actual number of the articles to be loaded is taken as the number of the article in the loading plan suitable for the current transportation.

Embodiment 2

According to this embodiment, a historic loading plan that is most approximate to the article to be loaded is sought. An approximation index between the articles to be loaded and the historic loading plan may be calculated by the means of Euclidean distance. For example, it is assumed that the articles to be loaded comprise articles A, B, C, and D. A first historic loading plan comprises articles A, B, E, and F, and a second historic loading plan comprises articles A, C, D, and F. The articles to be loaded may be expressed by a vector for articles to be loaded $\{1, 1, 1, 1, 0, 0\}$, where the first four 1's indicate that the articles to be loaded comprise articles A, B, C, and D, while the latter 0's indicate that the articles to be loaded do not include articles E and F. Similarly, the first historic loading plan may be expressed by a vector for the first historic loading plan $\{1, 1, 0, 0, 1, 1\}$, and the second historic loading plan may be expressed by a vector for the second historic loading plan $\{1, 0, 1, 1, 0, 1\}$. Calculating the Euclidean distance between vectors is known in the art. Thus, the Euclidean distance between the vector for articles to be loaded and the vector for the first historic loading plan is 2, namely:

$$\sqrt{(1-1)^2+(1-1)^2+(1-0)^2+(1-0)^2+(0-1)^2+(0-1)^2};$$

The Euclidean distance between the vector or articles to be loaded and vector for the second historic loading plan is $\sqrt{2}$, namely:

$$\sqrt{(1-1)^2+(1-0)^2+(1-1)^2+(1-1)^2+(0-0)^2+(0-1)^2}.$$

Thus, the Euclidean distance between the vector for articles to be loaded and the vector for the second historic loading plan is shorter, and therefore the articles to be loaded are more approximate to the second historic loading plan. In addition to using the Euclidean distance between vectors, the skilled in the art may easily design other index(es) to indicate an approximation index between the vector for articles to be loaded and the vectors for historic loading plan.

The adaptive index of a historic loading plan may be used to weight the approximation index. For example, in the above example, the Euclidean distance as calculated may be multiplied by the adaptive index to serve as the approximation index. By calculating the approximation index, at least one historic loading plan approximate to the articles to be loaded may be found. Thereafter, further processing may be performed to at least one historic loading plan that is approximate to the articles to be loaded, in order to obtain a loading plan suitable for the current transportation.

According to an embodiment of the present invention, the loading plan suitable for the current transportation may be obtained through a historic loading plan that is most approximate to the articles to be loaded. Apparently, if the adaptive index of the most approximate historic loading plan is sufficiently high, then the most approximate historic loading plan may be directly taken as the loading plan suitable for the current transportation. The "directly taken as" here comprises some basic processing to the most approximate historic loading plan which will be readily envisaged by those skilled in the art, for example removing those articles not to be loaded.

According to another embodiment, a plurality of historic loading plans whose approximation indexes are above an approximation degree threshold may be selected from the historic loading plan records, and then the articles to be loaded in the loading plan suitable for the current transportation may be determined, and the number of articles to be loaded included in the loading plan suitable for the current transportation may be calculated, based on the selected loading plan. The method of obtaining the loading plan suitable for the current transportation through a plurality of historic loading plans in Embodiment 1 is likewise suitable for this. For example, intersections between the selected historic loading plans and the articles to be loaded may serve as elements of a loading set. Of course, relevance between articles to be loaded may be further considered to divide a loading set, as depicted in Embodiment 1.

Figure 2:
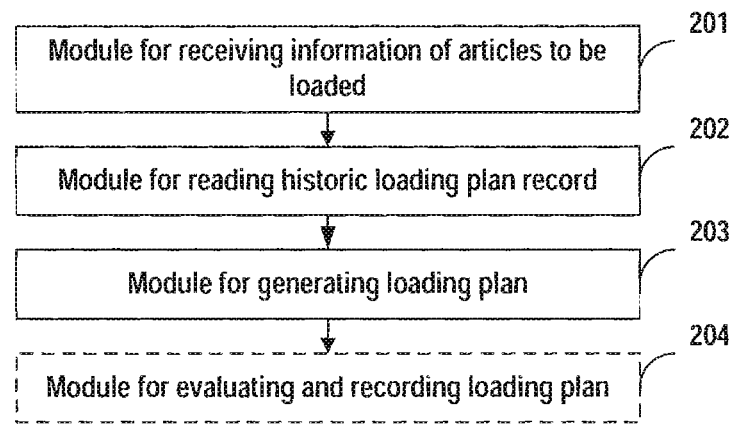
FIG. 2 shows a block diagram of a logistic information processing apparatus according to an embodiment of the present invention.

FIG. 2 shows a block diagram of a logistic information processing apparatus according an embodiment of the present invention.

As shown in FIG. 2, the logistic information processing apparatus according to the embodiments of this invention includes:

a module for receiving information of articles to be loaded 201, configured to receive information of articles to be loaded indicating items and numbers of the articles to be loaded;

a module for reading historic loading plan 202, configured to read a historic loading plan record, an item of the historic loading plan record at least comprising a loading plan and an adaptive index corresponding to the loading plan;

a module for generating loading plan 203, configured to generate a loading plan suitable for the current transportation based on the historic loading plan record and the information of articles to be loaded.

Optionally, the apparatus further comprises a module for evaluating and recording loading plan 204, configured to receive an adaptive index of the loading plan suitable for the current transportation, and to record the loading plan suitable for the current transportation and the adaptive index in the historic loading plan record; or configured to receive a modification to the loading plan suitable for the current transportation, to receive an adaptive index for the modified loading plan suitable for the current transportation, and to record the modified plan suitable for the current transportation and the adaptive index in the historic loading plan record.

Those normally skilled in the art may understand that the above method and system may be implemented with a computer-executable instruction and/or in a processor control code, for example, such code is provided on a bearer medium such as a magnetic disk, CD, or DVD-ROM, or a programmable memory such as a read-only memory (firmware) or a data bearer such as an optical or electronic signal bearer. The apparatuses and their components in these embodiments may be implemented by hardware circuitry of a programmable hardware device such as a very large scale integrated circuit or gate array, a semiconductor such as logical chip or transistor, or a field-programmable gate array, or a programmable logical device, or implemented by software executed by various kinds of processors, or implemented by combination of the above hardware circuitry and software.

Thus, having reviewed the disclosure herein, the skilled artisan will appreciate that aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Distinct software modules for carrying aspects of embodiments of the invention can be, in at least some cases, embodied on a computer readable storage medium.

The means mentioned herein can include (i) hardware module(s), (ii) software module(s), or (iii) a combination of hardware and software modules; any of (i)-(iii) implement the specific techniques set forth herein, and the software modules are stored in a computer readable medium (or multiple such media).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Thus, although a plurality of exemplary embodiments of the present invention have been illustrated and depicted, those skilled in the art will appreciate that without departing from the principle and spirit of the present invention, change may be made to these embodiments, and the scope of the present invention is limited by the appending claims and equivalent variations thereof.

What is claimed is:

1. A method for processing logistic information, comprising;
receiving, by a processor, information of articles to be loaded, indicating items and numbers of said articles to be loaded;
reading, said processor, a historic loading plan record, an entry of said historic loading plan record at least comprising a loading plan and an adaptive index based on a scoring of said loading plan; and
generating, by said processor, a loading plan suitable for current transportation based on said loading plan and said adaptive index of said historic loading plan record, and said information of said articles to be loaded.

2. The method according to claim 1, wherein generating said loading plan suitable for said current transportation based on said loading plan and said adaptive index of said historic loading plan record, and said information of said articles to be loaded comprises:

calculating relevance between said articles to be loaded based on said historic loading plan record;

allocating articles to be loaded that have higher relevance than a relevance threshold into a same loading set; and including said articles to be loaded belonging to said same loading set into said loading plan suitable for said current transportation.

3. The method according to claim 2, further comprising:

selecting, by said processor, a loading plan including articles to be loaded belonging to said same loading set from said historic loading plan record; and calculating, by said processor, said numbers of respective articles to be loaded included in said loading plan suitable for said current transportation based on said selected loading plan.

4. The method according to claim 3, wherein said calculating of said relevance between articles to be loaded based on said historic loading plan record comprises:

calculating, by said processor, said relevance weighted by an adaptive index between articles to be loaded.

5. The method according to claim 1, wherein said generating, of said loading plan suitable for said current transportation based on said loading plan and said adaptive index of said historic loading plan record, and said information of articles to be loaded comprises:

calculating an approximation index between articles to be loaded and a loading plan in said historic loading plan record;

selecting a loading plan from said historic loading plan record based on said approximation index;

determining articles to be loaded included in said loading plan suitable for said current transportation based on said selected loading plan; and calculating said numbers of respective articles to be loaded included in said loading plan suitable for said current transportation based on said selected loading plan.

6. The method according to claim 5, wherein said calculating, of said approximation index between said articles to be loaded and said loading plan in said historic loading plan record comprises:

calculating said approximation index weighted by an adaptive index between articles to be loaded and said loading plan in said historic loading plan record.

7. The method according to claim 5, wherein said calculating, of said numbers of respective articles to be loaded included in said loading plan suitable for said current transportation based on said selected loading plan comprises:

calculating said numbers of respective articles included in said loading plan suitable for said current transportation based on said historic loading plan record by solving a mathematical planning problem.

8. The method according to claim 5, wherein said calculating, of said numbers of respective articles to be loaded included in said loading plan suitable for said current transportation based on said selected loading plan comprises:

calculating said numbers of respective articles included in said loading plan suitable for said current transportation based on said historic loading plan record with an artificial neural network.

9. The method according to claim 5, wherein said calculating, of said numbers of respective articles to be loaded included in said loading plan suitable for said current transportation based on said selected loading plan comprises:

calculating said numbers of respective articles included in said loading plan suitable for said current transportation based on said historic loading plan record with a statistical method.

10. The method according to claim 1, further comprising:

receiving, by said processor, an adaptive index for said loading plan suitable for said current transportation; and recording, by said processor, said loading plan suitable for said current transportation and said corresponding adaptive index in said historic loading plan record.

11. The method according to claim 1, further comprising:

receiving, by said processor, modification to said loading plan suitable for said current transportation, to obtain a modified loading plan suitable for said current transportation;

receiving, by said processor, an adaptive index for said modified loading plan suitable for said current transportation; and recording, by said processor, said modified loading plan suitable for said current transportation and said corresponding adaptive index in said historic loading plan record.

12. A non-transitory computer readable storage medium for processing logistic information, the computer readable storage medium having computer readable program code embodied therewith, the computer readable program code comprising:

computer readable program code configured to receive information of articles to be loaded, indicating items and numbers of said articles to be loaded;

computer readable program code configured to read a historic loading plan record, an entry of said historic loading plan record at least comprising a loading plan and an adaptive index based on a scoring of said loading plan; and computer readable program code configured to generate a loading plan suitable for current transportation based on said loading plan and said adaptive index of said historic loading plan record, and said information of said articles to be loaded.

13. The non-transitory computer readable storage medium according to claim 12, wherein said computer readable program code configured to generate said loading plan suitable for current transportation is further configured:

to calculate relevance between said articles to be loaded based on said historic loading plan record;

to allocate articles to be loaded that have higher relevance than a relevance threshold into a same loading set; and to include said articles to be loaded belonging to said same loading set into said loading plan suitable for said current transportation.

14. The non-transitory computer readable storage medium according to claim 13, wherein said computer readable program code configured to generate said loading plan suitable for current transportation is further configured:

to select a loading plan including articles to be loaded belonging to said same loading set from said historic loading plan record; and to calculate said numbers of respective articles to be loaded included in said loading plan suitable for said current transportation based on said selected loading plan.

15. The non-transitory computer readable storage medium according to claim 14, wherein said computer readable program code configured to generate said loading plan suitable for current transportation is further configured:

to calculate said relevance weighted by an adaptive index between articles to be loaded.

16. The non-transitory computer readable storage medium according to claim 12, wherein said computer readable program code configured to generate said loading plan suitable for current transportation is further configured:
- to calculate an approximation index between articles to be loaded and a loading plan in said historic loading plan record;
- to select a loading plan from said historic loading plan record based on said approximation index;
- to determine articles to be loaded included in said loading plan suitable for said current transportation based on said selected loading plan; and
- to calculate said numbers of respective articles to be loaded included in said loading plan suitable for said current transportation based on said selected loading plan.

17. The non-transitory computer readable storage medium according to claim 16, wherein said computer readable program code configured to generate said loading plan suitable for current transportation is further configured:
- to calculate said approximation index weighted by an adaptive index between articles to be loaded and said loading plan in said historic loading plan record.

18. The non-transitory computer readable storage medium according to claim 16, wherein said computer readable program code configured to generate said loading plan suitable for current transportation is further configured:
- to calculate said numbers of respective articles included in said loading plan suitable for said current transportation based on said historic loading plan record by solving a mathematical planning problem.

19. The non-transitory computer readable storage medium according to claim 16, wherein said computer readable program code configured to generate said loading plan suitable for current transportation is further configured:
- to calculate said numbers of respective articles included in said loading plan suitable for said current transportation based on said historic loading plan record with an artificial neural network.

20. The non-transitory computer readable storage medium apparatus according to claim 16, wherein said computer readable program code configured to generate said loading plan suitable for current transportation is further configured:
- to calculate said numbers of respective articles included in said loading plan suitable for said current transportation based on said historic loading plan record with a statistical method.

21. The non-transitory computer readable storage medium according to claim 12, further comprising:
computer readable program code a recording module embodied on a nontransitory computer readable storage medium configured to receive an adaptive index for said loading plan suitable for said current transportation; and the recording module being further configured to record said loading plan suitable for said current transportation and said corresponding adaptive index in said historic loading plan record.

22. The non-transitory computer readable storage medium according to claim 12, wherein said computer readable program code configured to receive said adaptive index for said loading plan suitable for said current transportation is further configured:
- to receive modification to said loading plan suitable for said current transportation, to obtain a modified loading plan suitable for said current transportation;
- to receive an adaptive index for said modified loading plan suitable for said current transportation; and
- to record said modified loading plan suitable for said current transportation and said corresponding adaptive index in said historic loading plan record.

23. The method according to claim 2, wherein calculating, relevance between said articles to be loaded based on said historic loading plan record comprises:
determining relevance between an article i and an article j:

$$P(I,j)=Rr1/Rr2$$

wherein r1 and r2 both denote past loading plans, $R_{r1}$ and $R_{r2}$ denote adaptive indexes corresponding to r1 and r2, and R denotes a historic loading plan record.

24. An apparatus comprising:
a memory; and
one or more processors, coupled to said memory, and operative to:
receive information of articles to be loaded, indicating items and numbers of said articles to be loaded;
read a historic loading plan record, an entry of said historic loading plan record at least comprising a loading plan and an adaptive index based on a scoring of said loading plan; and
generate a loading plan suitable for current transportation based on said loading plan and said adaptive index of said historic loading plan record, and said information of said articles to be loaded.

25. The apparatus of claim 24, wherein the entry of the historic loading plan record further includes a transportation tool corresponding to the loading plan.

* * * * *